(12) United States Patent
Weisselberg et al.

(10) Patent No.: US 9,273,263 B2
(45) Date of Patent: Mar. 1, 2016

(54) SYSTEM FOR DRYING AND TORREFACTION

(71) Applicant: Wyssmont Company Inc., Fort Lee, NJ (US)

(72) Inventors: Edward Weisselberg, Kinnelon, NJ (US); Joseph Bevacqua, Leonia, NJ (US); Robert Borre, Wurtsboro, NY (US)

(73) Assignee: Wyssmont Company Inc., Fort Lee, NJ (US)

( * ) Notice: Subject to any disclaimer, the term of this patent is extended or adjusted under 35 U.S.C. 154(b) by 395 days.

(21) Appl. No.: 13/953,073

(22) Filed: Jul. 29, 2013

(65) Prior Publication Data

US 2013/0318865 A1    Dec. 5, 2013

Related U.S. Application Data

(60) Division of application No. 13/560,128, filed on Jul. 27, 2012, now Pat. No. 8,549,769, which is a continuation of application No. 13/312,428, filed on Dec. 6, 2011, now Pat. No. 8,266,812, which is a division of application No. 12/456,427, filed on Jun. 15, 2009, now Pat. No. 8,161,663.

(60) Provisional application No. 61/195,092, filed on Oct. 3, 2008.

(51) Int. Cl.
| | |
|---|---|
| *F26B 11/00* | (2006.01) |
| *C10L 5/44* | (2006.01) |
| *C10L 9/08* | (2006.01) |
| *F26B 17/00* | (2006.01) |
| *F26B 23/02* | (2006.01) |

(52) U.S. Cl.
CPC ............... *C10L 5/447* (2013.01); *C10L 9/083* (2013.01); *F26B 17/001* (2013.01); *F26B 23/022* (2013.01); *Y02E 50/10* (2013.01); *Y02E 50/14* (2013.01); *Y02E 50/15* (2013.01); *Y02E 50/30* (2013.01)

(58) Field of Classification Search
CPC .............. F26B 5/00; F26B 9/00; F26B 11/00; F26B 21/00; F26B 21/06; B65G 49/00; C10G 1/00; C10G 1/04; C10G 9/00; C10G 9/083; C02F 11/00; C02F 11/12
USPC ................ 34/505, 65, 218, 670; 202/10, 109; 60/670; 44/550, 629; 110/218
See application file for complete search history.

(56) References Cited

U.S. PATENT DOCUMENTS

| | | |
|---|---|---|
| 864,186 A | 8/1907 | Ostertag |
| 1,172,576 A | 2/1916 | Benjamin |

(Continued)

FOREIGN PATENT DOCUMENTS

| | | | |
|---|---|---|---|
| FR | 977529 A | 4/1951 | |
| FR | 993131 A | 10/1951 | |

*Primary Examiner* — Stephen M Gravini
(74) *Attorney, Agent, or Firm* — Lerner, David, Littenberg, Krumholz & Mentlik, LLP

(57) ABSTRACT

A method for torrefaction of water containing cellulosic materials is performed in an inert atmosphere. The cellulosic material is cascaded through the apparatus between a plurality of rotatable trays vertically stacked within multiple processing zones. Steam being generated from heating of the cellulosic material is recycled back to the apparatus to provide an inert atmosphere. The steam may be superheated in a heat exchanger. Exhaust from the torrefaction zone of the apparatus has some moisture and other volatiles removed prior to being reheated in a burner. The heated exhaust is used in the heat exchanger to superheat the recycled steam.

3 Claims, 6 Drawing Sheets

(56) References Cited

U.S. PATENT DOCUMENTS

| | | |
|---|---|---|
| 2,159,027 A | 5/1939 | Jalma et al. |
| 2,869,249 A | 1/1959 | Kamp |
| 2,903,400 A | 9/1959 | Poindexter et al. |
| 2,913,780 A | 11/1959 | Weisselberg |
| 3,681,855 A | 8/1972 | Weisselberg et al. |
| 3,728,797 A | 4/1973 | Worden, Sr. et al. |
| 3,777,409 A | 12/1973 | Weisselberg et al. |
| 3,787,292 A | 1/1974 | Keappler |
| 4,077,847 A | 3/1978 | Choi et al. |
| 4,098,649 A | 7/1978 | Redker |
| 4,285,773 A | 8/1981 | Taciuk |
| 4,787,917 A | 11/1988 | Leclerc de Bussy |
| 5,017,269 A | 5/1991 | Loomans et al. |
| 5,183,148 A | 2/1993 | Kondo |
| 5,279,712 A | 1/1994 | Constantine |
| 5,725,738 A | 3/1998 | Brioni et al. |
| 6,048,374 A | 4/2000 | Green |
| 6,558,644 B1 | 5/2003 | Berman |
| 6,588,349 B1 | 7/2003 | Ahtila et al. |
| 7,159,723 B2 | 1/2007 | Hilpert et al. |
| 8,061,140 B2 | 11/2011 | Harmon, Sr. |
| 8,105,400 B2 | 1/2012 | Bergman |
| 8,142,530 B2 | 3/2012 | Klepper et al. |
| 8,153,027 B2 | 4/2012 | Klepper et al. |
| 8,161,663 B2 | 4/2012 | Weisselberg et al. |
| 8,252,966 B2 | 8/2012 | Teal et al. |
| 8,266,812 B2 | 9/2012 | Weisselberg et al. |
| 8,266,821 B2 | 9/2012 | Weisselberg et al. |
| 8,276,289 B2 | 10/2012 | Causer |
| 8,304,590 B2 | 11/2012 | Hopkins et al. |
| 2003/0221363 A1 | 12/2003 | Reed |
| 2004/0220435 A1 | 11/2004 | Stubbing |
| 2006/0130396 A1 | 6/2006 | Werner |
| 2006/0280669 A1 | 12/2006 | Jones |
| 2007/0084385 A1 | 4/2007 | Lana et al. |
| 2007/0220805 A1 | 9/2007 | Leveson et al. |
| 2007/0266623 A1 | 11/2007 | Paoluccio |
| 2012/0292175 A1* | 11/2012 | Weisselberg ............ C10L 9/083 201/27 |
| 2013/0104451 A1* | 5/2013 | Carlin .................... C10L 5/445 44/606 |
| 2013/0110291 A1* | 5/2013 | Carlin ...................... C10L 5/44 700/272 |
| 2014/0082998 A1* | 3/2014 | Brock .................... C10L 5/447 44/589 |

\* cited by examiner

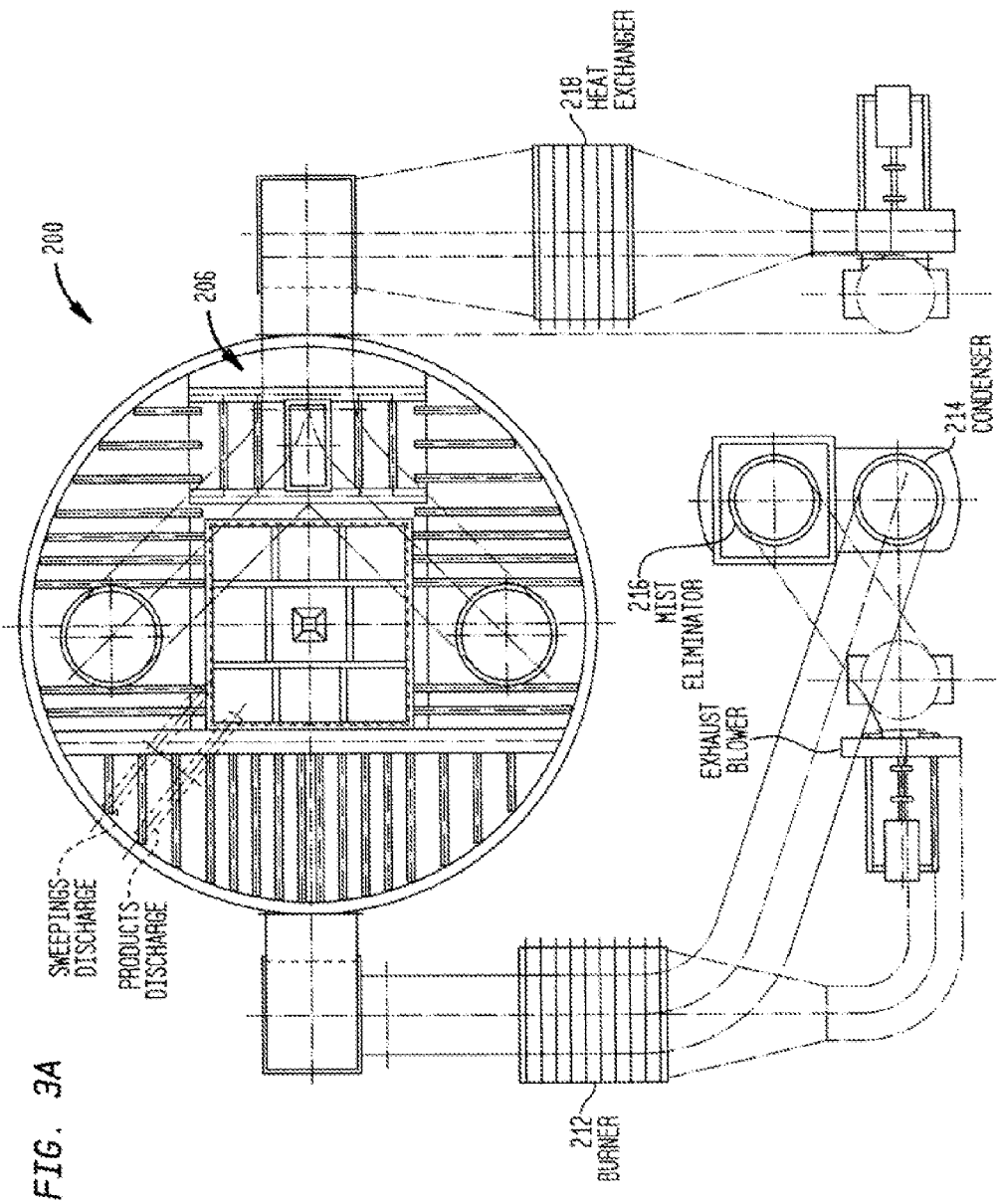

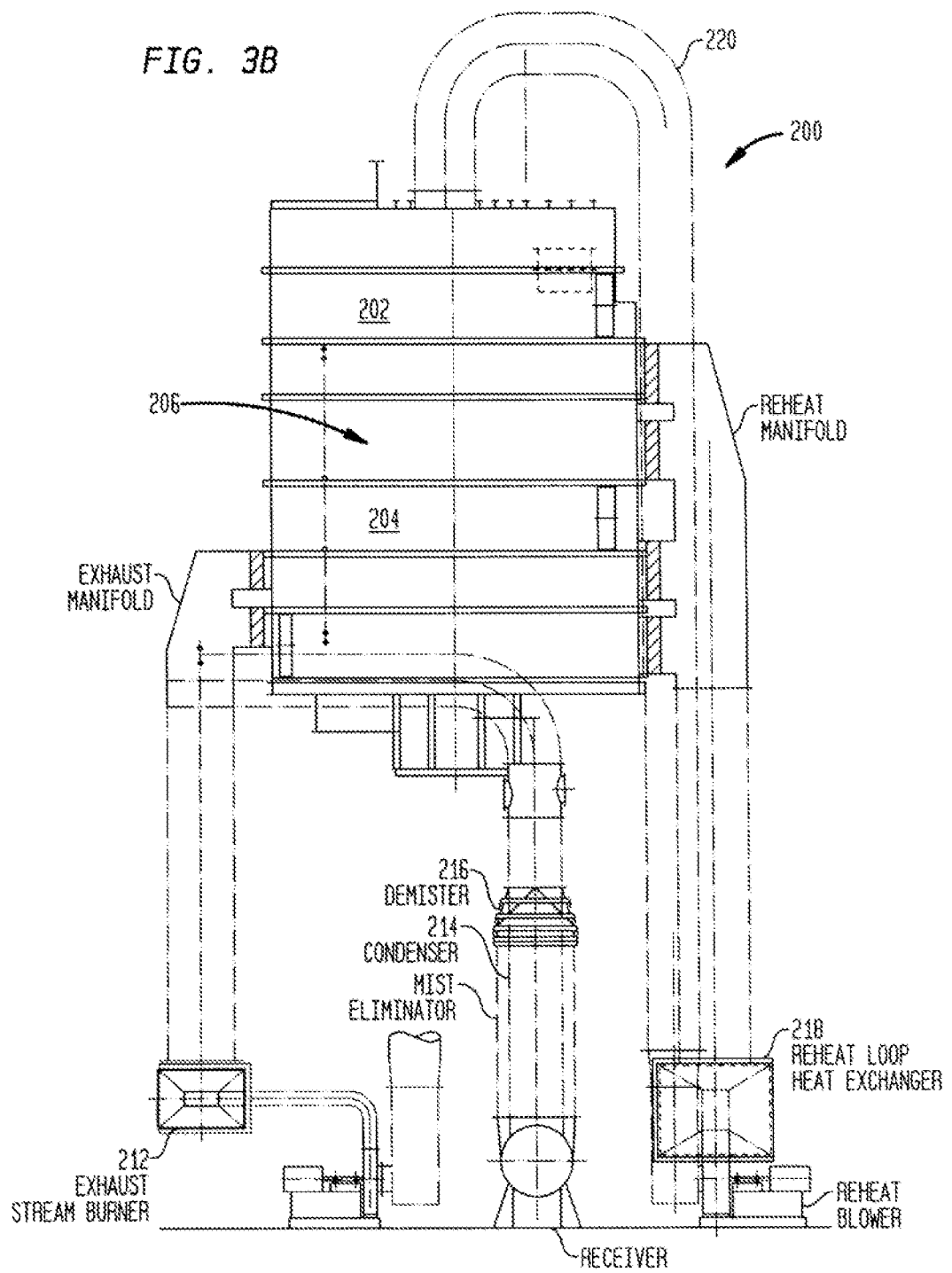

SYSTEM FOR DRYING AND TORREFACTION

CROSS-REFERENCE TO RELATED APPLICATIONS

This application is a divisional of U.S. patent application Ser. No. 13/560,128, filed on Jul. 27, 2012 which is a continuation of U.S. application Ser. No. 13/312,428, filed on Dec. 6, 2011, which is a divisional of U.S. application Ser. No. 12/456,427, filed on Jun. 15, 2009, now U.S. Pat. No. 8,161,663, which claims the benefit of the filing date of U.S. Provisional Application No. 61/195,092, filed Oct. 3, 2008, the disclosures of which are incorporated herein by reference.

BACKGROUND OF THE INVENTION

Torrefaction is generally known as the process of thermal treatment of various cellulosic materials under an inert (i.e., non-oxidizing) atmosphere to convert such materials into a more useful product. For example, wood when dried and heated to a temperature of about 200° C. to 290° C. becomes what has been referred to as "torrefied wood", i.e., a carbon-neutral product with a high fixed carbon content, a high caloric value, a very low moisture content, and which is generally non-hygroscopic and rot proof, having retained practically all the pyroligneous compounds. Examples of torrefaction and equipment therefore are disclosed in U.S. Pat. No. 4,787,917 and U.S. Patent Application Pub. No. 2003/0221363, the disclosures of which are incorporated herein by reference.

The present invention relates in general to improvements in systems and methods for drying and torrefaction of various materials.

SUMMARY OF THE INVENTION

It has been known to first dry the material to be torrefied in one piece of equipment, and to subsequently conduct the torrefaction in a separate piece of equipment at higher temperatures. This has obvious disadvantages. One aspect of the present invention is to provide a single apparatus for both drying and torrefaction of various materials in a torrefaction chamber, particularly cellulose based materials such as wood and the like. To this end, one aspect of the invention provides a stacked multi-level tray heating apparatus having an upper portion or section where the material to be torrefied is first dried. As the material is dried, the moisture content driven off from the material is converted into steam and/or gas, at least some of which may be recycled into a lower portion or section of the apparatus where the material is to be torrefied. According to another aspect, the material may be subjected to quenching prior to discharge from the apparatus.

By way of one example, raw wood is run through a wood chipper to produce wood chips having a preferred particle size of less than about ½-inch. The wood chips may also include pellets, shreds, sawdust, wood flours and the like. The chipped wood is stored in a large hopper and is metered from the hopper into the top of the drying chamber. No special treatment of the wood is required prior to its introduction into the drying chamber. The temperature of the feed stock entering the drying chamber depends upon prevailing climatic conditions at the time of use, and can be anywhere from about (−)10° C. to about 40° C. Moisture content of the feedstock can be generally anywhere in the range of about 10% to about 60% of the original weight of the feedstock. However, it is contemplated that higher moisture contents can be processed as well.

The feedstock is introduced into the top of the drying zone at a uniform rate via a feeder where it is deposited onto the uppermost tray in the torrefaction chamber. The uppermost tray of the torrefaction chamber rotates slowly in a horizontal plane. After being carried almost completely around on the tray, the wood chips encounter a wiper bar which plows the woods chips until they fall through one of several slots in the tray. The chips that have been pushed off the first tray are now deposited onto a second tray below the first tray. This tray is also slowly rotating in synchronization with all of the other trays in the torrefaction chamber. After continuing to rotate a short radial distance, the chipped wood on the second tray may encounter a leveler bar if provided which causes the pile of wood chips to be evenly distributed upon the tray at a predetermined height. This predetermined height is adjustable by way of example between about ½" to about 3-inches. Distributing the pile of chips at a uniform height allows all of the chips to be uniformly warmed by the hot gas circulating within the top of the torrefaction chamber, and this in turn results in a very uniform processing condition.

The top section or zone of the torrefaction chamber is temperature controlled to within about 1° C. The exact temperature used with the top zone depends upon the species of wood being torrefied, the initial moisture content of the wood, and other variables related to the properties of the feedstock.

After being carried almost completely around on the tray, the wood chips encounter a wiper bar which plows the woods chips until they fall through one of several slots in the tray. The chips are then deposited upon the third tray down from the top. This process continues until the torrefied chips are deposited upon the lowermost tray. After being carried almost completely around on this tray, the wood chips encounter a wiper bar which plows the woods chips until they fall through one of several slots in the tray onto the floor of the torrefaction chamber or directly to a discharge chute. A final series of wipers push the torrefied chip out the bottom discharge of the torrefaction chamber.

The torrefaction chamber is multi-zoned to give very accurate drying and torrefaction of the wood chips as they progress down through the torrefaction chamber. The present invention has advantages of not forming a pyrochar. A pyrochared material has a high ash content, and is less valuable because it is not as hydrophobic, and will not pelletize as well as torrefied wood. One or more internal fans which can be mounted vertically in the center of the torrefaction chamber pushes the inert heated atmosphere around in a circular, horizontal pattern within the torrefaction chamber and across the pile of chips as they lay on the rotating trays.

In torrefaction, various gases are evolved, such as carbon monoxide, carbon dioxide, various organic compounds, water, and possibly other non-organic compounds. One aspect of this invention is to burn the carbon monoxide and organic vapors and use the heat evolved to provide some of the heat for drying and torrefying. The inert atmosphere may consist substantially of steam and/or other inert gas such as nitrogen. Torrefaction of the cellulosic products, and more specifically the removal of bound water and volatiles in the feedstock, are conducted in a closed, inert, system which allows capture of volatile materials so that the commercial value of the captured volatiles can be realized either by combustion to recover their caloric value or by recovery as a saleable by-product.

In accordance with one embodiment there is described an apparatus for the torrefaction of water containing cellulosic material within an inert atmosphere, the apparatus comprising a material processing chamber having a plurality of processing zones adapted for processing water containing cellulosic material, a plurality of material supports within the processing zones for receiving cellulosic material cascading within the chamber, the material processing chamber having a first outlet for the discharge of steam generated from processing the cellulosic material within the processing zones, and at least one inlet for recycling at least a portion of the steam into the material processing chamber, whereby the steam at least partially provides an inert atmosphere within the material processing chamber.

In accordance with another embodiment there is described an apparatus for processing materials, the apparatus comprising a material processing chamber having an upper portion and a lower portion, a rotatable assembly within the chamber extending from the upper portion to the lower portion, the assembly including a plurality of vertically displaced material supports supported on a portion of the assembly; a drive device for causing the material supports to rotate; a first inlet at the upper portion of the material processing chamber adapted to receive material to be processed and to deposit the material at least partially onto at least one material support; a first exhaust outlet for exiting exhaust steam generated within the material processing chamber; a second inlet for recycling at least a portion of the exhaust steam into the material processing chamber; and wherein said material processing chamber is at least partially maintained under an insert atmosphere by the recycled exhaust steam; and a heat exchanger coupled between the first exhaust outlet and the second inlet for heating the at least a portion of the exhaust steam, at least a portion of the heated exhaust steam recycled to the material processing chamber.

In accordance with another embodiment there is described a method for torrefaction of water-containing cellulosic material within an inert atmosphere, the method comprising cascading cellulosic material between a plurality of rotatable trays vertically stacked within a plurality of processing zones provided within a material processing chamber, heating the cellulosic material within the material processing chamber to generate steam from the contained water in the cellulosic material, discharging the steam generated from the cellulosic material from the material processing chamber, and recycling at least a portion of the steam to at least one of the processing zones within the material processing chamber, wherein the steam at least partially provides an inert atmosphere within the material processing chamber.

In accordance with another embodiment there is described a method for torrefaction of water-containing material within an insert atmosphere, the method comprising passing material to be torrefied between a plurality of material supports within a material processing chamber, heating the material within the material processing chamber to generate steam from the contained water within the material being processed, exhausting the steam from the material processing chamber, heating the steam exhausted from said material processing chamber, returning at least a portion of the heated steam to the material processing chamber, wherein the steam at least partially creates an inert atmosphere within the material processing chamber, and discharging the torrefied material from the material processing chamber.

In accordance with another embodiment there is described a method for processing material, comprising feeding material into a material processing chamber having an upper portion and a lower portion, and a rotatable assembly extending between the upper portion and the lower portion supporting a plurality of vertically displaced material supports; applying heat within the upper portion of the material processing chamber for drying the material; collecting exhaust from the material processing chamber; recycling the collected exhaust to the processing chamber; torrefying the material within the lower portion of the material processing chamber; and discharging the material from the material processing chamber.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 3A is a top plan view of another embodiment of a torrefaction apparatus in accordance with the present invention;

FIG. 3B is a front elevational view of the torrefaction apparatus illustrated in FIG. 3A;

DETAILED DESCRIPTION

Figure 1:
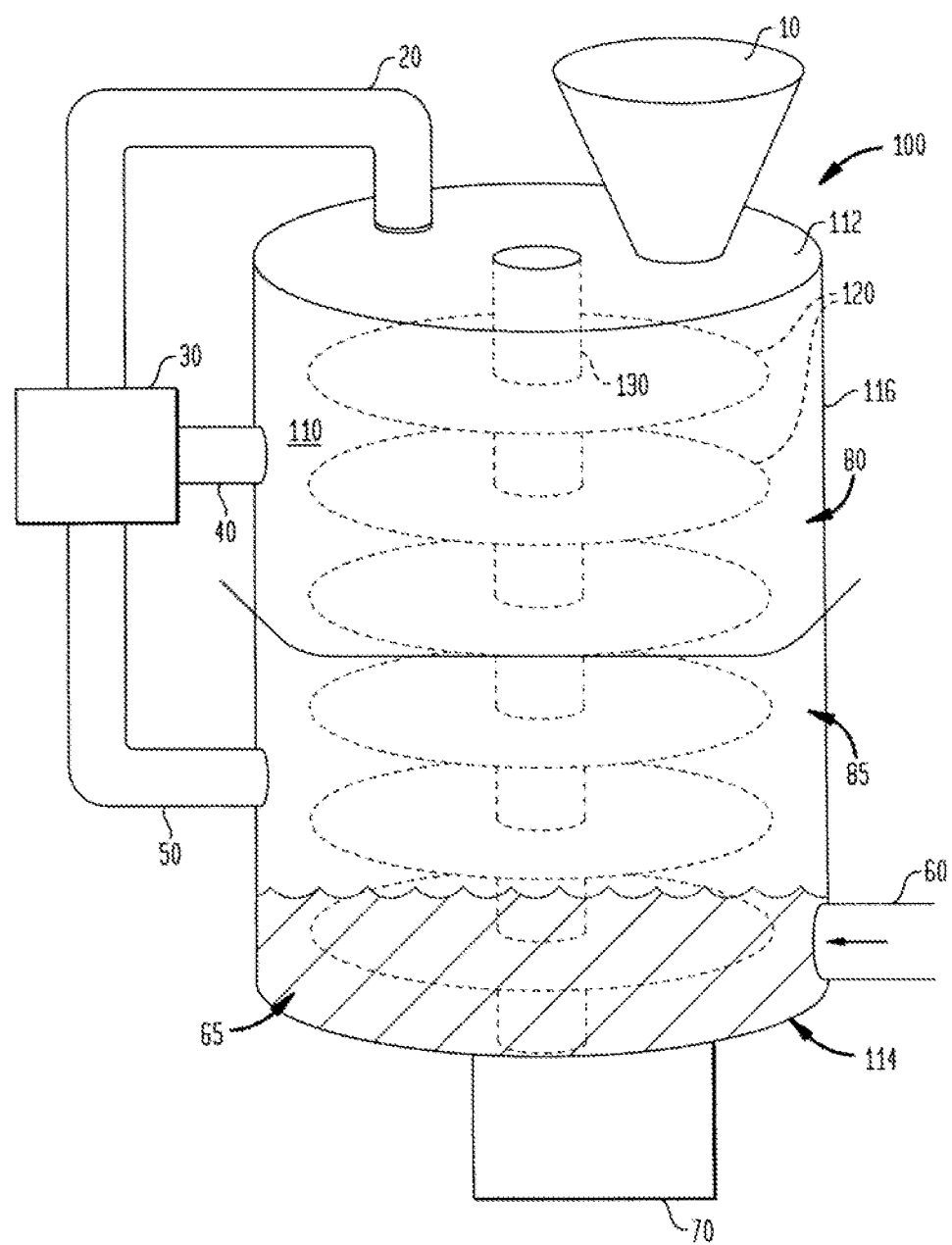
FIG. 1 is front elevational view of an apparatus for torrefaction of materials such as wood containing cellulosic materials in accordance with one embodiment of the present invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

FIG. 1 shows an example of an apparatus 100 for drying and torrefying material in accordance with one embodiment of the present invention. As shown, a hollow chamber 110 forming the torrefaction chamber is cylindrically or polygonally enclosed by sidewall 116 which extends around the circumference of the chamber, a top plate 112, and a bottom plate 114. The chamber has two sections or portions—an upper portion 80 and a lower portion 85. Each section will typically have multiple zones. The upper and lower portions are contiguous with each other thereby forming essentially a single continuous processing chamber where drying and torrefaction take place simultaneously on a plurality of levels or zones.

According to this aspect of the invention, drying of the material is generally performed in the upper portion 80 and torrefaction is performed in the lower portion 85. In this manner, the apparatus can operate continuously by continuously supplying material to be processed in the upper portion and removing continuously the torrefied material from the lower portion. Moreover, the drying process and torrefaction process may complement one another and in some circumstances the torrefaction process may compensate for inadequate drying. For example, if material passing through the drying process is not sufficiently dried, the torrefying process will compensate by causing the moisture content of the material to evaporate. In this regard, the upper portion 80 and lower portion 85 may operate at substantially the same temperature, or one portion may operate at a higher or lower temperature relative to the other portion.

The apparatus 10 may include any of a variety of components for transferring the material through the different levels. For example, the apparatus may incorporate a plurality of vertically displaced material supports such as shelves, or trays 120. According to one embodiment, the trays may include apertures, thereby allowing material to pass through from one tray to a lower tray. For example, the trays may be attached to a rotating structure, and thus may rotate about a substantially vertical axis as the structure rotates, with a cantilevered device extending over the trays pushing material through the aperture. Alternatively, the trays may remain stationary, and the cantilevered device may sweep across the trays to transition the material thereon. Accordingly, the material may be transferred from a feed port 10 onto a first tray level, and continuously through the upper portion 80 and the lower portion 85 via the tray levels to a discharge port 70. For example, wiper arms may be used to transfer the material from one tray level to the next tray level below, or gyrating trays with large perforations may be used to shake the material from one tray level down to the next tray. According to the invention shown in FIG. 1, a plurality of spaced apart stacked trays 120 are rotated by a shaft 130. As will be explained in further detail below with respect to FIG. 2, the trays 120 may include apertures for transferring the material from one tray level 120 down to the next tray level as they rotate while processing the material.

Material fed through the port 10 for processing may be undried or substantially undried, that is, having different levels of moisture content. Typically, the feed material is wood or another cellulosic material, such as bagasse, peat, grasses, peanut shells, etc. having various water content (e.g., between about 10% and 60% water), but may also include other volatiles to be evaporated in the drying process. Cellulosic material contains lignin, which maintains the caloric value of the torrefied end product, and allows pelletization of the torrefied cellulosic material. It is contemplated that non lignin containing materials such as mosses can also be torrefied using the apparatus and methods of the invention.

As the material is dried in the upper portion 80 of the chamber, the moisture content from the material is evaporated creating water vapor (steam). The steam rising through the chamber 10 may be discharged through the exhaust port 20 attached to the top plate 112. At least some of this exhaust steam may be recycled back to the chamber 110 to provide all or part of an inert atmosphere. For example, the exhaust port 20 may be connected to a heat exchanger 30, where the steam can be reheated to a superheated state. The heat exchanger may be further connected to inlets 40 and 50, for recycling the heated steam to the upper portion 80 and/or lower portion 85 of the chamber, respectively, at adjustable ratios.

The torrefied material will catch fire if it is exposed to the outside atmosphere before it is sufficiently cooled. Accordingly, another aspect of the invention provides an inlet 60 for delivering a quenching substance to the lower portion 85 of the chamber for quenching the torrefied material prior to discharge. The quenching substance may be water, or any other inert liquid or slurry. Quenching with water is the fastest way to do this cooling. The quenching substance may be discharged with the torrefied material through discharge port 70, or may be discharged separately through another outlet (not shown), thereby enabling a constant flow of the quenching substance to the chamber. The quenching substance may be recycled to the chamber, and cooled through a refrigeration device (not shown) as may be desired.

Figure 2:
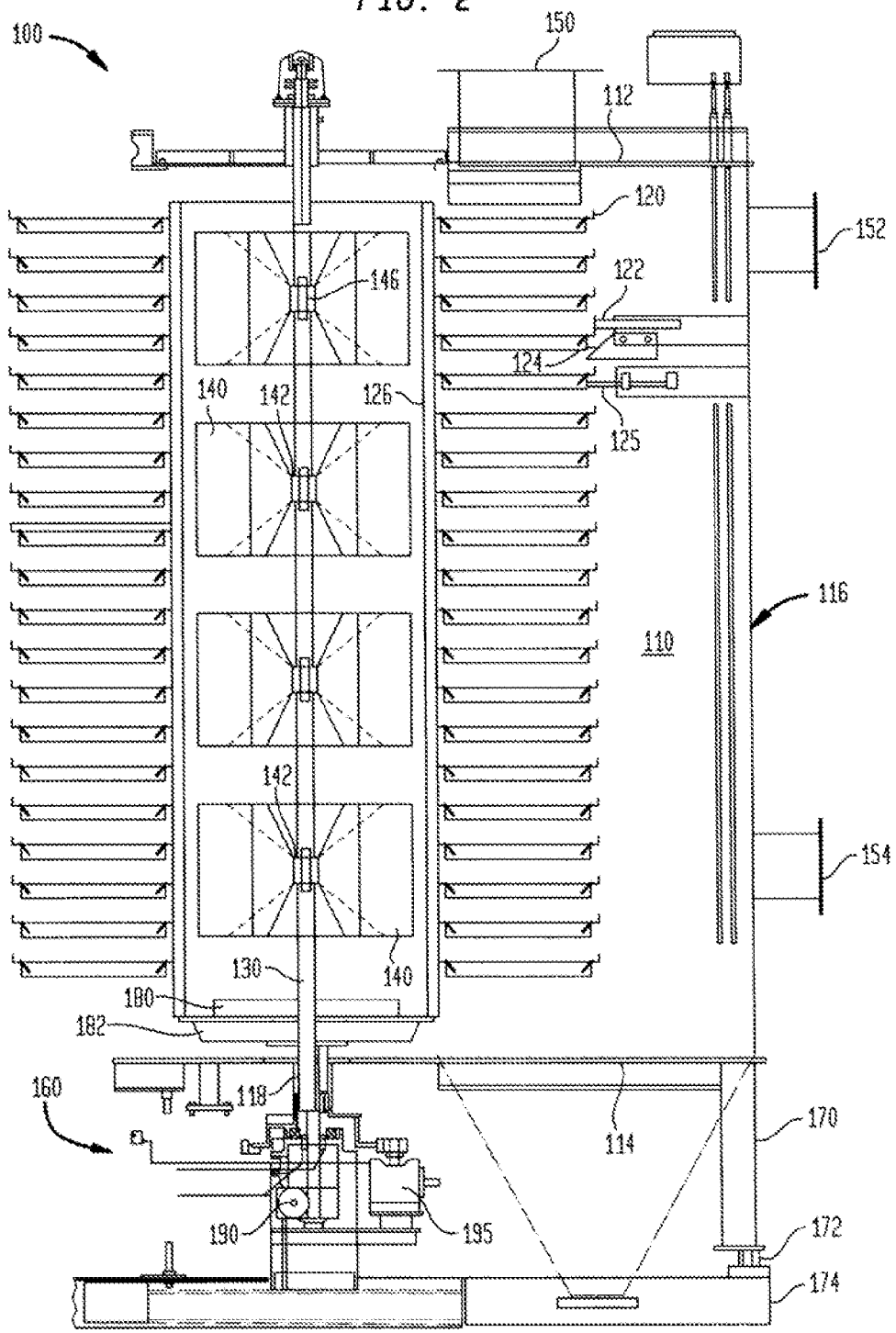
FIG. 2 is a cross-sectional view of another embodiment of a torrefaction apparatus in accordance with the present invention.

FIG. 2 shows an example of an apparatus 100 for processing materials according to another embodiment of the present invention. Certain aspects of the construction of the apparatus to be described is disclosed and described in co-pending application Ser. No. 11/975,144, filed on Oct. 17, 2007, the disclosure of which is incorporated herein by reference. The apparatus 100 has particular application where toxic or reactive gasses may be present or are generated within the apparatus during torrefaction of the material. The apparatus 100 includes a chamber 110, in this instance a drying/torrefying chamber, wherein the materials are processed. The apparatus 100 further includes at least one drive assembly 160, which may power operations within the chamber 110, though being located outside.

The drying/torrefying chamber is cylindrically enclosed by sidewall 116 which extends around the circumference of the chamber 110, a top plate 112, and a bottom plate 114. The chamber 110 is supported on a base 174 by supports 170 and may be connected via expansion joints 172. The expansion joints 172 enable the supports 170 to move as the chamber expands due to, for example, increased heat therein. This reduces stress applied to the structure of the apparatus 100.

Inside the chamber 110, the apparatus may incorporate a set of trays 120 surrounding a set of vertically-aligned fans on a fan shaft 130. The fans may circulate the atmosphere inside the chamber over the material in the trays 120. The material to be processed may be placed on the top tray level and progressively transferred to lower tray levels. Each tray is connected to at least one stanchion 126, wherein several stanchions are positioned around a fan shaft 130, thereby forming a squirrel cage. Coupled to the stanchions 126 is a turntable 182 at the lower end of the chamber. According to one embodiment, the turntable 182 is connected to a rotating tray structure which surrounds the fan shaft 130. Drive gears 160 cause the turntable 182 to rotate, thereby causing the stanchions 126 and trays 120 to revolve.

A tray wiper 122 in the nature of a cantilevered device may be positioned above each tray 120. As each tray 120 rotates, the tray wiper 122 transfers the material to the next tray level. A rigidly mounted leveler 125 may brush across the top of the material placed thereon, thereby leveling the material and exposing materials underneath the top portion to the environment within the chamber 110. Material that is spilled by the tray wiper 122 over the side of the tray (i.e., between the shaft and the rotating trays) falls onto catch plate 124. This plate 124, angularly positioned with respect to the trays 120, causes the material which is spilled off a tray 120 above to fall into a tray 120 below. In this manner, the material being processed cascades downwardly from the upper tray to the lower tray.

According to one aspect, a turntable sweeper 180 may be positioned above the turntable 182. The turntable sweeper 180 may prevent complications potentially caused by materials falling onto the turntable 182.

As the processed material is being rotated and moved as described above, further drying elements may be implemented within the chamber 110. For example, several fans 140 may be included in the chamber 110 to facilitate circulation of heated gasses and superheated steam therein and to effect a more even temperature profile within the chamber. The fans 140 may be connected to the fan shaft 130 by keys 146. The fan shaft 130 may extend beyond the bearing assembly 250 and connect to a reducer 190 at its lower end. The reducer 190 may be powered electrically, or by other sources such as hydraulic, steam, gas, or a mechanical crank. As the reducer 190 causes the shaft 130 to rotate, fan blades 140 would in turn rotate, thus pushing the internal environment within the chamber across the trays 120.

The processed material may further be exposed within the chamber 110 to gasses provided through an inlet 152. For example, a duct may be connected to the inlet 152, and regenerated superheated steam, heated gasses, desiccants, or other inert, reactive, or non-reactive gasses may be provided to the upper portion of the chamber 110 through the duct. Similarly, a duct may be connected to inlet 154, and regenerated superheated steam, heated air, gasses, desiccants, or other inert, reactive, or non-reactive gasses may be provided to the lower portion of the chamber 110 through the duct. An exhaust 150 provides an outlet for the gasses which may be recycled to the chamber 110 through the inlets 152, 154. According to one embodiment, ducts connected to the exhaust may lead to a conditioning unit such as a heat exchanger 30 further connected to the inlets 152, 154, thereby allowing the gasses to be recycled through the chamber 110.

Alternatively or additionally, internal heating within the chamber may be used. For example, in smaller units electrical heaters may be placed within the chamber to heat the atmosphere. In other units, U-tubes (i.e., hollow tubes with flames inside) may be positioned within the chamber and connected to an exhaust and a natural gas inlet port. As the water content from the processed materials evaporates, the fans may blow the steam across the U-tubes for reheating.

To prevent the gasses provided to the chamber 110 from escaping, seal assemblies are placed around the shaft 132 and near the opening 118. Shaft 130 may be formed of metal or any variety of other materials. Further, although the apparatus 100 as described herein includes a rotating shaft 130, the shaft 130 may be capable of other motions, such as gyrating.

Figure 4:
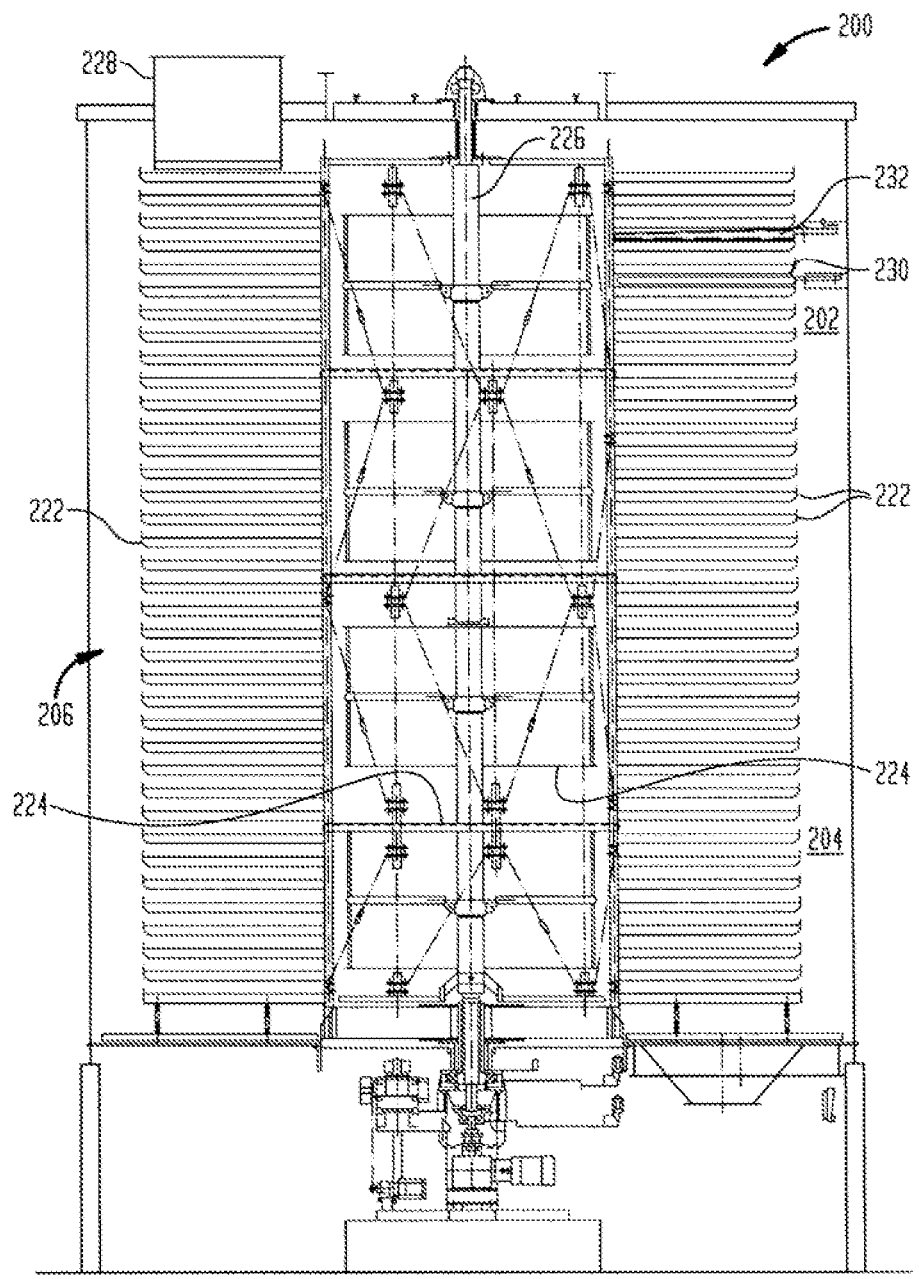
FIG. 4 is a cross-sectional view of another embodiment of a torrefaction apparatus in accordance with the present invention.
Figure 5:
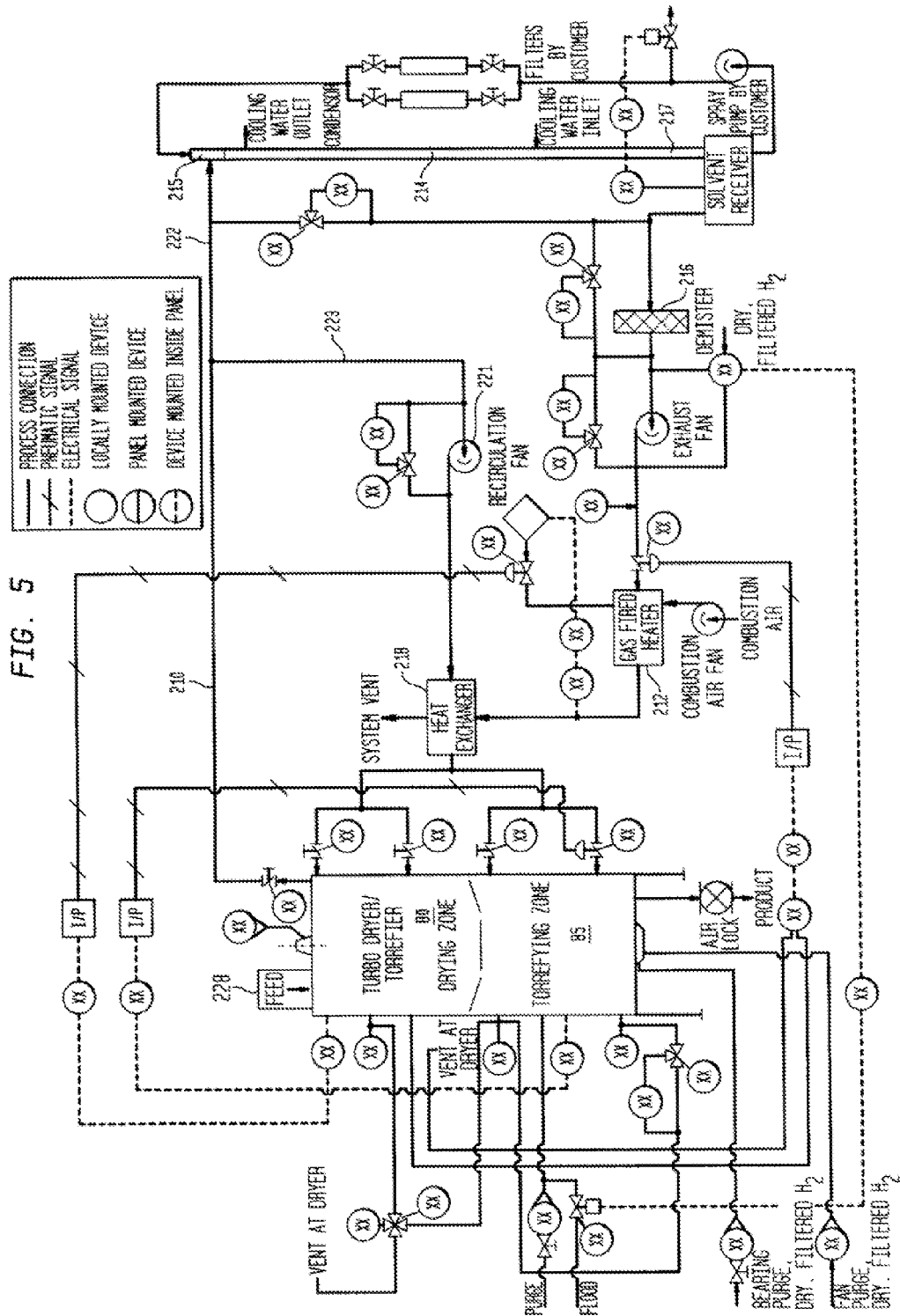
FIG. 5 is a schematic illustration of a torrefaction apparatus which may be implemented in accordance with the present invention.

Referring to the remaining figures, there is illustrated an apparatus 200 in accordance with another embodiment of the present invention. By way of brief description, FIG. 3A is a top plan view of a drying/torrefying apparatus, and FIG. 3B is a front view thereof. FIG. 4 is a detailed view of the inner components of the drying/torrefying apparatus. FIG. 5 is a diagrammatic view of the valves and connections providing fluid or gaseous substances to and from the chamber of the drying/torrefying apparatus and elsewhere in the system, such as the burner.

Substantially undried cellulosic material is dried and torrefied in the dryer/torrefier apparatus which is constructed as one piece of equipment. The moisture evaporated from the wood during drying and torrefying is used as an inert medium in the lower portion 204 of the apparatus where the wood is being torrefied. The water vapor may be heated to a superheated state internally within the apparatus and/or circulated via duct 220 through an external heat exchanger 218 before being recycled back into the apparatus. The inert super-heated steam may be supplemented by another inert gas such as nitrogen. If the torrefied material gets exposed to oxygen, e.g. from air, before it is sufficiently cool upon discharge from the apparatus, it will ignite, which would destroy its beneficial characteristics and be a safety hazard.

This system of drying and torrefaction in a single apparatus is more thermally efficient than drying the material separately. It is also simpler and less expensive from the view point of capital expenditure and operating costs. According to one aspect, such drying and torrefaction may be performed in a TurboDryer® unit sold by WYSSMONT® Corp. as may be modified pursuant to the present invention. However, other systems which may be used include any type of a vertical apparatus with trays or plates or hearths that retain the material and in which the material moves down through the apparatus by means of arms, blades, or other such devices.

The apparatus may also incorporate a quenching section. For example, water can be provided at the bottom of the apparatus or in the discharge area for the processed material. According to one aspect, water may be provided in a constant flow to ensure that the water remains under a predetermined temperature. For example, an additional inlet may be fed to a lower portion of the apparatus, with an additional outlet being placed in the lower portion as well. The inlet and outlet may be positioned on substantially opposing sides of the internal processing chamber 206 provided in the apparatus, or the outlet may be the same as the discharge for the processed materials. In this regard, cool water may be fed to the chamber through the inlet, and discharged through the outlet, thereby creating a steady flow of cool water. Moreover, the discharged water may be cooled in a separate unit, and recycled back to the inlet. The quenching is to cool off the torrefied material quickly. If the torrefied material gets exposed to oxygen, e.g. from air, before it is sufficiently cool it will ignite which, would destroy its beneficial characteristics and be a safety hazard. An application in which the product is not quenched may be cooled under inert gas to avoid having the hot torrefied material start combusting.

Torrefied product can be discharged through a double airlock with intermediate purge to prevent exposure to oxygen before the product is reduced in temperature to below the auto-ignition temperature of the torrefied cellulosic material.

A system is shown in FIGS. 3-5 where a portion of the exhaust 210 from the torrefaction, which has a number of different types of exhaust gases and vapors including but not necessarily limited to carbon monoxide, carbon dioxide, nitrogen, water vapor, acetic acid and/or other organic vapors, is circulated to a condenser 214 having an inlet 215 and an outlet 217 which removes the water and other condensibles. The exhaust gasses could also be discharged directly to the atmosphere if environmentally permitted, or passed through a thermal oxidizer. From the condenser 214, the remaining exhaust gases may be provided to a burner 212, where it is burned with a supplementary heating system. That is, because the excess air in the burner 212 would cause problems (i.e., fire) in the drying/torrefying chamber, the exhaust gases are passed through an air-to-air heat exchanger 218 for heating the remaining portion of the discharged steam from duct 223 to be recycled. Steam generated generally within the upper drying section of the torrefaction chamber is exhausted via conduit 210 via a circulation fan 221. The portion of the exhausted steam to be recycled is fed to heat exchanger 218 where it is reheated, e.g., superheated, via the heated gases supplied from burner 212. The superheated steam from the heat exchanger 218 is fed to multiple sections or zones of the torrefaction chamber to provide heat for drying and torrefaction through one or more inlet ducts. In addition, the superheated steam also provides the inert atmosphere within the torrefaction chamber.

A process for drying/torrefying wood as an example will now be described with respect to the apparatus described above. Wood is one type of cellulosic material. Wood is a generic name for a wide range of differing materials. Generally, wood is divided into two major classes: hardwoods or softwoods. The following table gives relative compositions:

| Component | % mass in softwood | % mass in hardwood |
|---|---|---|
| Cellulose | 40 to 44% | 43 to 47% |
| Hemicellulose | 25 to 29% | 25 to 35% |
| Lignin | 25 to 31% | 16 to 24% |
| Extractives | 1 to 5% | 2 to 8% |

When torrefying at elevated temperature, the hemicellulose portion of the wood will begin to decompose at lower temperatures than the other components of wood. This decomposition occurs rapidly in the presence of oxygen and less rapidly when oxygen is not present.

The apparatus and method of the present invention provides exact temperature control in each drying/torrefaction zone which maximizes the temperature at which torrefaction can occur, without crossing over into the temperature at which the exothermic reaction of the hemicellulose occurs. The higher the temperature that can be achieved while torrefying, without causing a decomposition of the hemicellulose, produces a more commercially valuable torrefied wood. Torrefied wood is sold based upon its net caloric value. In operation, the preferred temperatures in the torrefaction chamber is in the range of about 220° C. to about 280° C., and more preferably from about 260° C. to about 280° C., although temperatures in the range of about 200° C. to about 300° C. are contemplated.

In implementing the torrefaction process using a rotating tray type apparatus having a plurality of stacked trays 222 with internal circulation fans 224 on a single shaft 226 (such as describe above), the material being processed drops down through the stationary feed chute 228 onto the top tray of the rotating trays. Ideally, the material falls onto the trays uniformly. The material may be spread out using, for example, a mounted leveler 230 to give more uniform drying of the material on the trays by exposing materials underneath the top portion to the environment within the chamber. The material on the trays rotates most of the way around the interior of the chamber forming the drying section.

A tray wiper 232 in the nature of a cantilevered device may be positioned above each tray level 222. As each tray 222 rotates, the tray wiper 232 transfers the material to the next underlying tray. The material that is spilled by the tray wiper may fall onto a catch plate 124 such as shown in FIG. 2 or other suitable device. The plate 124, angularly positioned with respect to the trays 222, causes the material which is spilled off a tray above to fall onto a tray below. In this manner, the material being processed cascades downwardly from the top trays to the bottom trays. This action is repeated throughout the drying section (the upper portion 80) of the dryer/torrefier apparatus.

In the upper drying section in the preferred operation, the water that is evaporating from the processed material is retained in this section where it acts as an inert medium to prevent the wood from burning at temperatures in which it would normally combust in air. The atmosphere with the evaporated water may also be removed from the apparatus via conduit 210 and then recycled back into the lower torrefaction section of the apparatus after being re-heated via burner 218 as described above. It is also contemplated that the water vapor can be recycled back into the upper drying section 80 if desired.

Initially the inert atmosphere can be composed of 100% nitrogen or some other inert gas including steam. As steam evolves from the wood chips being torrefied, the inert atmosphere is partially or wholly displaced by evolved water which eventually becomes a superheated steam. Since 100% nitrogen atmosphere may be initially used during the initial startup, for all practical purpose the torrefaction chamber runs all of the time with superheated steam, a small amount of nitrogen, and some volatiles creating the inert atmosphere. The torrefaction chamber can optionally include a nitrogen flooding system which will flood the torrefaction chamber with nitrogen in the event of a high oxygen content developing within the torrefaction chamber due to an upset condition. This is a safety control designed to prevent fires within the torrefaction chamber.

The purpose of the rotating internal fans 224 as previously described is twofold. The fans immediately mix the incoming hot steam with the steam currently within the torrefaction chamber. For example, steam which has been externally heated to a temperature as high as 300° C. can be introduced into the torrefaction chamber at any of several points along the vertical height of the torrefaction chamber in any combination. The volume of superheated steam introduced into the torrefaction chamber at each entry point can be separately controlled to optimize the process.

The superheated steam which is introduced into the torrefaction chamber is immediately mixed with steam already within the torrefaction chamber which may be and is usually at a much lower temperature. At the top of the torrefaction chamber the incoming feedstock temperature could be 10° C. As it begins to dry, the water trapped within the wood is evolved. This water vapor immediately mixes with the steam at 300° C. to yield a much lower internal drying temperature in this zone of the torrefaction chamber. The exact temperature within the uppermost zone of the torrefaction chamber is monitored and controlled. Both the inlet temperature and/or the inlet flow can be controlled to yield any zone temperature required for optimization of the process.

The size of the top zone can be controlled by design of the central fans 224 or by installation of baffle plates to separate higher trays from trays lower down in the construction of the torrefaction chamber. The uppermost zone can consist of any number of trays, but in one example, is in the range of three to fifteen trays. The top zone is typically controlled at a temperature in the range of about 200° c. to about 260° C. range.

As the wood chips continue down through the torrefaction chamber, the chip temperature continues to increase. The hotter the steam used to dry the chips the more rapid the increase in chip temperature. As the chips continue downward through the torrefaction chamber, they may encounter higher steam temperatures as they pass into the next torrefaction chamber zone. This process continues through successively hotter zones until the chips are reduced in water content to about 1% to about 3%. At this point the chips begin to torrefy. Volatiles are driven off and additional water is removed from the wood chips. During the downward passage of wood chips through the torrefaction chamber as few as one temperature zone or multiple zones (e.g., eight or more temperature zones) may be encountered depending upon the design of the torrefaction chamber.

The wood chips evolving their water content results in the partial displacement of the nitrogen initially within the torrefaction chamber during startup. Once operating, generally without stoppage for weeks or months at a time, there remains no significant amount of nitrogen within the torrefaction chamber. The internal, inert atmosphere is composed of water in the form of superheated steam, residual nitrogen, and volatiles that have been evolved from the wood chips. It is contemplated that supplemental inert gas can be added to the torrefaction chamber to maintain an inert atmosphere.

This water vapor is discharged as superheated steam from the torrefaction chamber at one or more points along the vertical sides of the chamber, the top of the chamber via conduit 210, or the bottom of the chamber. The superheated steam can be condensed via a condenser 214 to remove a portion of the water and/or other volatiles from the system. For example, if the wood chips are evolving water at the rate of 20,000 pounds per hour of water, the condenser can be designed to remove the 20,000 pound per hour from the system once stabilization of the inert atmosphere has occurred.

In accordance with one embodiment of the invention, the condenser 214 has two inlets and two outlets. One inlet is for that portion of the superheated vapor exiting the torrefaction chamber in duct 222. The second inlet is for the cold water used to cool the superheated steam and to condense out the excess water. One outlet is for the residual superheated vapor which is now colder, no longer superheated, and carrying less remaining water. The second outlet from the condenser is for the cooling water which is now warmer due to having been used to cool the superheated steam. The remaining exiting residual vapor via duct 223 is re-heated via heat exchanger 218 using heated exhaust from burner 212 to an elevated temperature and then injected back into the torrefaction chamber at any number of zones where it once again can be used to heat the wood chips and to capture evolved water from the wood chips. The superheated steam provides the inert atmosphere within the torrefaction chamber. The amount of the superheated vapor being supplied to the condenser 214 versus the amount of the superheated vapor being supplied to the burner 218 to be recycled can be controlled as may be required by the water content and the water-handling capacity of the burner.

By drying and torrefaction in one piece of equipment, higher temperatures can be used in the drying section to reduce the drying time. In the lower torrefying section 85, temperatures between, for example, in the range of about 200° C. to about 290° C. can be used. One advantage of drying and torrefying in the same unit is that you do not have to control the final moisture content from the drying section very closely as you would with separate systems. In the rotating tray type apparatus, the temperature and velocities of the heating medium are easily adjusted.

In an apparatus where quenching occurs inside the unit, the entire bottom of the torrefaction chamber (as part of it) can be filled with water which is continuously replenished. The hot torrefied cellulose material is wiped off the bottom shelf into the water to prevent it from catching fire after it leaves the apparatus. The hot torrefied material must be cooled to a temperature where it will not combust in contact with air, otherwise it can burst into flames. Quenching can also be done in the discharge chute of the torrefaction chamber or in other equipment that follows the torrefaction chamber.

One advantage of the system is that drying and torrefaction are done essentially under atmospheric pressure. Another advantage is that carbon monoxide is maintained in the system rather than outside as could occur with other drying and torrefaction systems.

The design of the torrefaction chamber allows several variables to be controlled: 1) The exit points from which the superheated steam leaves the torrefaction chamber can be designed to occur at one or more elevations simultaneously; 2) The amount of superheated steam removed from the torrefaction chamber at each exit point can be controlled; 3) The amount of water removed from the superheated steam can be controlled; 4) The re-injection temperature of the superheated steam and the location of the re-entry points along the surfaces of the torrefaction chamber can be controlled individually; 5) As the product progresses further down through the torrefaction chamber the superheated steam begins to include more and more volatile gases; and 6) Superheated vapor containing volatiles can be removed from one or more locations along the vertical side of the dryer. As before, the superheated vapor can be treated to remove excess water and/or volatile components.

In the lower sections of the torrefaction chamber there is very little excess steam present since the wood chips are no longer giving up excess water. The unique zone design of the torrefaction chamber allows the collection of volatile components to occur most efficiently in the lower sections without the need to remove large amounts of water from the volatiles. The torrefaction chamber system may include numerous discharge points from which superheated steam can be exited and then treated to remove water vapor and/or volatiles. The chamber may also include numerous re-entry points into which superheated steam can be re-injected into the torrefaction chamber at controlled temperatures. By combining both the drying process and the torrefaction process in a single vertical design, the torrefaction process can be designed to produce a torrefied wood product having maximum caloric value and commercial value. The ability to precisely control both the drying conditions and the torrefaction conditions provides the advantage whereby the lignin present in the cellulosic material is neither broken down nor driven off.

The torrefaction chamber as thus far disclosed can be zoned into multiple drying/torrefaction zones. This can be done by physically dividing the horizontal cross section into compartments using horizontally mounted baffle(s) or by design of the fans so that temperature zones are created by the segmented nature of the fan design. It is contemplated that one can use a combination of these two methods.

Drying conditions are controlled by regulating the temperature of each drying/torrefaction zone. There are several possible ways of doing this. One contemplated example includes the total caloric input into the system is determined by the external burner firing rate. Heat recovery devices such as condensers and air pre-heaters are used to recover "waste" heat and to reduce the energy input into the system. In another example, individual zones are created and controlled by: regulating the volume of steam introduced into each zone; by regulating the temperature of the steam introduced into each zone; by regulating the vertical height of each zone; by regulating the vapor takeoff from each zone; by regulating the temperature at which the steam is condensed; by regulating the temperature at which the volatiles are condensed; and by any combination of the foregoing.

By way of example, an input of approximately 1500 BTU's per pound of wood is contemplated to produce a torrefied product having a usable caloric value of approximately 10,000 BTU's per pound. This ratio is impacted by the initial moisture content of the cellulosic material and by the species of cellulosic material being torrefied.

Pelletization of the torrefied wood allows the torrefied wood to be used in commercial applications. Processes that produce a product with less lignin result in pellets that are more sensitive to breakage, create dust problems at the point of usage, and have less commercial value. The lignin in the product produces a strongly hydrophobic material. This is desirable because prior to use as a fuel, the torrefied, pelletized, cellulosic material will be stored in the open and is exposed to climatic conditions. The more hydrophobic the torrefied, cellulosic, material the less likely the pellets will absorb water in high humidity conditions, or will absorb water during a rain or snow. Any water absorbed reduces the commercial value of the torrefied material by reducing the net caloric value. The process produces an end product that is more uniform compared with products produced by other processes. The end product is both uniform, particle-to-particle, but also throughout the cross-section of each particle. A uniform product allows for precise and reproducible pelletizing of the torrefied cellulosic material.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for the torrefaction of cellulose containing material, comprising:
   a material processing chamber adapted for torrefying water containing cellulose material cascading therethrough, the chamber including an upper drying zone and a lower torrefying zone in communication with the upper drying zone, wherein the upper drying zone is adapted for removing water from the cellulosic material, and the lower torrefying zone is adapted for torrefying the cellulosic material received from the upper drying zone;
   a plurality of material supports arranged within the upper drying zone and the lower torrefying zone for receiving the cellulose material cascading downwardly through each zone, each of the plurality of material supports having an opening for the passage of material being processed thereon, wherein the material cascades downwardly through the processing chamber from one material support to another underlying material support;
   an outlet in communication with the processing chamber for exiting exhaust gas from within the processing chamber, the exhaust gas including steam formed in the upper drying zone and at least one volatile gas component formed in the lower torrefying zone, wherein the steam at least partially provides an inert atmosphere within the processing chamber;
   an inlet in communication with the processing chamber;
   at least one fan within the processing chamber for circulating heated gas over the material being processed with the plurality of material supports in the upper drying zone and the lower torrefying zone;
   a burner in communication with the at least one volatile gas component of the exhaust gas from the outlet for creating combustion gas by combustion of at least a portion of the at least one volatile gas component; and
   a heat exchanger in communication with both the combustion gas from the burner and the exiting exhaust gas from the processing chamber for heating at least a portion of the exiting exhaust gas for recycling to the processing chamber through the inlet.

2. The apparatus of claim 1, further including an assembly for rotating the plurality of material supports.

3. A method for torrefying material containing cellulose and water, comprising using the apparatus according to claim 1 for drying the material in the upper drying zone and torrefying the material dried in the upper drying zone in the lower torrefying zone.

* * * * *